United States Patent [19]

Schermer et al.

[11] Patent Number: 5,719,216
[45] Date of Patent: Feb. 17, 1998

[54] PREPARATION PROCESS FOR POLYMER-MODIFIED BITUMEN

[75] Inventors: Wilhelmina Elisabeth Maria Schermer; Koen Steernberg, both of Amsterdam, Netherlands

[73] Assignee: Shell Oil Company, Houston, Tex.

[21] Appl. No.: 752,987

[22] Filed: Nov. 21, 1996

[30] Foreign Application Priority Data

| May 22, 1995 | [EP] | European Pat. Off. | 95303466 |
| May 22, 1995 | [EP] | European Pat. Off. | 95303467 |
| Oct. 10, 1995 | [EP] | European Pat. Off. | 95307142 |

[51] Int. Cl.$^6$ ................................................ C08L 95/00
[52] U.S. Cl. ....................... 524/68; 524/59; 524/69; 524/71
[58] Field of Search ............................. 524/59, 68, 69, 524/70, 71

[56] References Cited

U.S. PATENT DOCUMENTS

| 3,611,888 | 10/1971 | Kavalir et al. | 404/74 |
| 3,634,293 | 1/1972 | Bonitz | 524/69 |
| 4,154,710 | 5/1979 | Maldonado et al. | 524/71 |
| 4,314,921 | 2/1982 | Biegenzein | 106/281.1 |
| 4,503,176 | 3/1985 | Barlow et al. | 524/68 |
| 5,036,119 | 7/1991 | Berggren | 524/68 |
| 5,070,123 | 12/1991 | Moran | 524/69 |
| 5,120,777 | 6/1992 | Chaverot et al. | 524/68 |

FOREIGN PATENT DOCUMENTS

| 0096638 | 6/1983 | European Pat. Off. | C08L 95/00 |
| 0360656 | 9/1989 | European Pat. Off. | C08L 95/00 |
| 0458386 | 5/1991 | European Pat. Off. | C08L 95/00 |
| 0496457 | 1/1992 | European Pat. Off. | C10C 3/02 |
| 2025986 | 6/1979 | United Kingdom | C08J 3/00 |
| 93/17076 | 2/1992 | WIPO | C08L 95/00 |

*Primary Examiner*—Peter A. Szekely
*Attorney, Agent, or Firm*—Donald F. Haas

[57] ABSTRACT

A method for improving the storage stability of a polymer-modified bituminous composition, which comprises using as a compatibilizing agent a bis(nitroaryl) disulphide and/or nitroaryl aryl disulphide. The invention further provides a polymer-modified bituminous composition comprising such a compatibilizing agent.

9 Claims, No Drawings

PREPARATION PROCESS FOR POLYMER-MODIFIED BITUMEN

FIELD OF THE INVENTION

Polymer-modified bitumens are widely used in road construction, roofing, sealing etc. Most interest commercially lies in bitumens modified with styrenic thermoplastic rubbers, particularly styrene-butadiene block-copolymers, for which the mechanical properties are in many ways superior to conventionally used bitumens.

BACKGROUND OF THE INVENTION

Polymer-bitumen blends are two phase systems. Bitumen itself is a complex mixture of molecular structures which include maltenes and asphaltenes. The addition of, e.g., thermoplastic rubbers disturbs the phase equilibrium and leads to phase separation particularly on hot storage into a polymer-rich layer and an asphaltene-rich layer. Each of these two phases has distinctly different properties. Therefore storage stability is an important requirement for polymer-modified bitumens. This is especially so for the road industry.

There have been a large number of proposals for ensuring or improving storage stability. Firstly, phase separation can be avoided or reduced by the use of compatible bitumens which have low asphaltene content and high aromaticity. On their own, compatible base bitumens have poorer properties for, e.g., road usage than incompatible base bitumens, but with a polymer-modified system the effect is reversed—blends based on compatible bitumens generally outperform blends based on incompatible bitumens. However, because of limited availability of compatible base bitumens, there is a strong need for a mechanism to render incompatible bitumen-polymer blends storage stable.

It has been proposed to use high shear mixing at temperatures of from 260° C. to 310° C. in special equipment (U.S. Pat. No. 4,314,921); to prolong the hot mix time to avoid separation (European Patent Application No. 0 458 386 A1); and to use various additives such as an inorganic acid (U.S. Pat. No. 5,070,123), an unsaturated dicarboxylic aliphatic acid or anhydride (European Patent Application No. 0 496 457 A1) and carbon black (U.S. Pat. No. 5,036,119). The additives proposed are often to be added to one or other of the polymer and bitumen components to modify the component and/or to cause chemical coupling of polymer and bitumen to encourage the long-term stability of the resulting blend.

More commonly, sulphur and also peroxides have been proposed as such coupling agents. Peroxides in polymer-bitumen compositions have been proposed, inter alia, in U.S. Pat. Nos. 3,634,293 and 4,503,176, and the use of sulphur in, for example, U.S. Pat. Nos. 3,634,293 and 4,154,710, in British Patent No. 2,025,986, in U.S. Pat. No. 5,120,777 and in European Patent Applications Nos. 0 360 656 A and 0 096 638 B1. In the latter three documents the sulphur source may be a compound which acts as a sulphur-donor or agent which yields free, elemental or radical sulphur during the polymer-modified bitumen preparation process. Such sulphur sources include various dialkyl disulphides and diaryl disulphides, thiuram disulphides and amino disulphides. Some of these are known as vulcanisation agents (morpholino disulphide and polyalkyl phenol disulphides) and vulcanisation accelerators (tetramethyl thiuram disulphide). All disclosures require free sulphur during the blending process to give rise to the coupling necessary for homogenisation and storage stability.

Peroxides are expensive and highly reactive; because of their reactivity such agents can adversely affect the composition of the polymer-bitumen blend and its properties. Free sulphur is a cheaper, less reactive alternative but it is not always efficient (with some blends homogenisation does not occur and with others gellation can be a severe problem) and most importantly it gives rise to hydrogen sulphide formation at the elevated temperature of the blending process which is environmentally unacceptable.

As noted above certain disulphides are well known as vulcanisation accelerators. Tetramethylthiuram disulphide is proposed to be added (as an alternative to elemental sulphur) to a homogenised rubber-bitumen blend to produce cross-linked rubber in an asphalt composition to utilise, e.g., waste tire rubber particles, in World Patent Application No. WO 93/17076.

In U.S. Pat. No. 3,611,888 small amounts of a mixture of dixylyl disulphides are used in a polymer-bitumen blend to prevent any tendency of the elastomer to cure during heating in the manufacture or use of the resulting sealant composition. No indication is given as to when such an additive is incorporated into the polymer-modified bitumen composition but the general process outlined and the use of the additive suggests that it is necessary to incorporate it into the polymer component prior to mixing with the other components, which include a resin and a plasticizer in addition to asphalt (bitumen) selected to produce a composition which remains stable on heating.

None of the documents above discloses the use of disulphides as a compatibilizer for polymer-bitumen blends except as a source of free sulphur to act as a conventional coupling agent in the blending process. Against these conventional proposals, it has now surprisingly been found that a small group of disulphides are highly useful compatibilizing agents which render polymer-bitumen blends homogeneous and storage stable, and also give rise to polymer-bitumen compositions with well-balanced properties that are often better than those homogenised by other processes. One particular disulphide, bis(4-nitrophenyl)disulphide, provides storage stable homogeneous polymer-bitumen compositions with an unexpected exceptionally good low temperature fracture and high service temperature performance combination.

SUMMARY OF THE INVENTION

Accordingly, the present invention provides a method for improving the storage stability of a polymer-modified bituminous composition, which comprises using as a compatibilizing agent a bis(nitroaryl) disulphide and/or nitroaryl aryl disulphide, especially a bis(nitrophenyl) disulphide and/or nitrophenyl phenyl disulphide. The disulphide is suitably added to the polymer-bitumen components in an amount of from 0.1 to 10% by weight of the final composition. Preferably, in the range of from 0.1 to 2% by weight is used, and especially 1% by weight. By the method of the invention, it is also possible to compatibilize blends prepared by other methods but which have separated wholly or partially on storage.

DETAILED DESCRIPTION OF THE INVENTION

Conventional blending of polymer and bitumen is carried out at elevated temperature, i.e. above room temperature, usually at a temperature in the range of from 100° C. to 250° C.

Suitably, the blending temperature is maintained in the range of from 150° C. to 200° C. and preferably at 180° C.

Generally, the mixing of polymer and bitumen is carried out with stirring and often using a high-speed or high-shear mixer.

The disulphide compatibilizing agent may be added initially to the polymer component, to the bitumen component or to a preblended mixture of the two, or the polymer, bitumen and compatibilizing agent may be mixed together all at once. It has been found useful to preblend the polymer and bitumen, prior to adding the disulphide, for a short time period of sufficient length to provide an even distribution of polymer in the bitumen, suitably using a high-shear mixer and at elevated temperature. The mixing time is envisaged as of the order of an hour or less, and is suitably 30 minutes. Whilst an even distribution is achieved, should no compatibilizer be added the two components would normally separate on storage once the mixing had stopped. After addition of the disulphide the high-shear mixing at elevated temperature is suitably continued for a time sufficient to achieve full homogenisation, this may be for up to 15 hours but may be from 1 to 10 hours. With certain systems this additional mixing time may be in the range of from 2 to 4 hours. If other components are to be added to the composition this may occur at any suitable stage in the blending process.

The present invention concentrates on the use as a compatibilizer of bis(nitroaryl) disulphides and nitroaryl aryl disulphides. The disulphide is suitably added to the polymer-bitumen components in an amount of from 0.1 to 10% by weight of the final composition. Preferably, in the range of from 0.1 to 2% by weight is used, and especially 1% by weight. Not only do these types of disulphides provide good homogeneity and storage stability in a relatively short homogenation time, but they also surprisingly impart to the stabilised composition significantly improved beneficial properties indicative of a better low temperature performance and a better high temperature service life for e.g. road applications, than other blends compatibilized with disulphides. It is possible that these groups of disulphides, and bis(nitrophenyl) disulphides and nitrophenyl phenyl disulphides in particular, acts on the polymer and bitumen components via a different mechanism than other disulphides tested.

The aryl group of the bis(nitroaryl) disulphide or nitroaryl aryl disulphides may be any aryl group; suitable examples include phenyl and pyridyl groups. The aryl group may be substituted by other substituents than the required nitro group; suitable substituents include $C_{1-6}$alkyl, preferably $C_{1-4}$alkyl and especially methyl groups, halogen atoms, hydroxy groups, additional nitro groups, amino groups and carboxylic acid groups or their derivatives such as salts, esters, amides and anhydrides, but especially carboxy groups. Alkyl herein includes linear and branched alkyl groups and halogen is to be understood as including fluorine, chlorine, bromine and iodine.

Preferred examples of bis(nitroaryl) disulphides for use as compatibilizing agents in the present invention include bis(2-nitrophenyl) disulphide, bis(3-nitrophenyl) disulphide, bis(4-nitrophenyl) disulphide and their nitropyridyl analogues, and bis(3-carboxy, 4-nitrophenyl) disulphide, which are all effective compatibilizers. Most preferred is bis(4-nitrophenyl) disulphide which additionally imparts significantly improved properties to a resulting compatibilized polymer-bitumen blend. Preferred examples of nitroaryl aryl disulphides include i.e. 2-nitrophenyl phenyl disulphide, 3-nitrophenyl phenyl disulphide and 4-nitrophenyl phenyl disulphide. Most preferred is 4-nitrophenyl phenyl disulphide.

Mixtures of disulphides may be used provided that at least one is a bis(nitroaryl) disulphide or nitroaryl aryl disulphide.

Where different isomeric forms exist then either the pure isomer or a mixture of isomers may be used. Of course, the nitroaryl di-sulphide may be used in conjunction with other compatibilization agents or conditions purely in order to impart the beneficial improved properties on the resulting polymer-bitumen blend—naturally though with the speedy and complete homogenisation provided by the nitroaryl disulphides the additional compatibilization measures will normally be redundant.

The polymers of the polymer-bituminous composition may be any polymer normally used in such compositions. Thus it may, for example, be a polyisoprene, polybutene, polyacrylate or polymethacrylate polymer or a block copolymer of a conjugated diene, e.g. butadiene, isoprene, pentadiene or hexadiene, and a monovinyl aromatic hydrocarbon e.g. styrene, methylstyrene, vinylnaphthalene, vinyltoluene or vinylxylene.

Advantageously the polymer is a styrene-butadiene block copolymer, especially the triblock copolymer commonly known as an SBS block copolymer. Such copolymers may be linear or radial, and of any useful styrene content. Suitably the styrene content is in the range of from 10 to 55% by weight, as measured by ASTM 3314, more preferably 30 to 40% by weight. Such copolymers may be prepared by any method known in the art including by sequential polymerisation or by the coupling of prepolymerized blocks. The SBS polymer may be present in an amount in the range of from 1 to 15% by weight of the final composition.

The bituminous component present in the bituminous composition may be a naturally occurring bitumen or derived from a mineral oil. Also petroleum pitches obtained by a cracking process and coal tar can be used as the bituminous component as well as blends of various bituminous materials. Examples of suitable components include distillation of "straight-run bitumens", precipitation bitumens, e.g. propane bitumens, blown bitumens, e.g. catalytically blown bitumen or "Multiphalte", and mixtures thereof. Other suitable bituminous components include mixtures of one or more of these bitumens with extenders (fluxes) such as petroleum extracts, e.g. aromatic extracts, distillates or residues, or with oils. Suitable bituminous components (either "straight-run bitumens" or "fluxed bitumens") are those having a penetration of in the range of from 50 to 250 dmm at 25° C.; therefore quite hard bitumens of a penetration of from 60 to 70 dmm may be used, but generally a straight run or distilled bitumen having a penetration in the range of from 150 to 250 dmm will be the most convenient to use. Both compatible as well as incompatible bitumens may be used.

Naturally, the most benefit from this invention comes from use with incompatible bitumens. However, the improved and well balanced properties of the resulting polymer-bitumen blend suggest that the disulphide additive may be of use with compatible bitumen-polymer blends not just to assist homogenisation but also to provide an improvement of the resulting properties of the composition. This is particularly the case with the bis(nitrophenyl) disulphides.

The bituminous composition may also contain other ingredients such as may be required for the end-use envisaged. Thus fillers may be included, for example talc, calcium carbonate and carbon black, or other components including resins, oils, stabilisers or flame retardants may be incorporated. The content of such fillers and other components may be in the range of from 0 to as much as 40% by weight.

The storage stable compositions resulting from the present invention find use in any of the areas in which polymer-modified bitumens are utilised, for example in road, roofing, sound deadening, vibration damping, adhesive, coating and sealant applications.

The beneficial properties imparted to the compositions by use of the disulphide compatibilizer in the present invention make the resulting polymer-modified bitumens, especially those compatibilized with bis(nitrophenyl) disulphides, of particular use as binders in asphalt compositions for road and paving construction and repair. For such usage polymer-modified bitumens containing in the range of from 1 to 10%, especially from 3 to 7%, by weight are preferred.

The present invention further provides the use of the above diaryl disulphides as compatibilizing agents for polymer-modified bituminous compositions. In particular the present invention provides the use of a bis(nitroaryl) and/or nitroaryl aryl di-sulphide disulphide, preferably bis (nitrophenyl) disulphide and/or nitrophenyl phenyl disulphide, and especially bis(4-nitrophenyl) disulphide and/or 4-nitrophenyl phenyl disulphide, as both a compatibilizing agent and an additive imparting improved properties, especially improved low temperature and high temperature performance properties, to a polymer-modified bituminous composition.

The present invention also provides a polymer-modified bituminous composition which comprises as a compatibilizing agent a bis(nitroaryl) disulphide and/or nitroaryl aryl disulphide as mentioned hereinbefore.

The following Examples illustrate the present invention.

EXAMPLE 1

A blend of 5% weight-by-weight of polymer in bitumen was prepared for Comparison Examples A and B and a number of diaryl disulphides tested as compatibilizers, by the following procedure in which a Silverson L4R high shear mixer was used.

An incompatible bitumen of Venezuelan origin having a penetration of 80 was heated to 160° C. and subsequently the polymer, a linear styrene-butadiene-styrene (SBS) block copolymer with a molecular weight of 180,000 gr/mol and a styrene content of 30% was added. During polymer addition the temperature increased to 180° C. as a result of the energy input of the mixer. The blend was stirred at high shear for 30 minutes and the mixing temperature maintained at 180° C. by switching the mixer on and off as necessary.

For Compounds 1 to 7, and Comparison B, 1% weight-by-weight of the test disulphide was then added to the blend with the stirring continued at half the maximum speed and the temperature maintained at 180° C. The homogeneity of the blend was checked frequently with fluorescence microscopy (homogeneity as determined by fluorescence microscopy corresponds to hot storage stability) and for Compounds 1 to 7 the blending process was stopped when a single yellow phase was observed; the mixing time to achieve a single phase was noted. For comparison B, when after 12 hours of mixing no homogeneity was observed, the mixing was stopped.

The properties of the prepared blends were assessed using the following test methods:

Softening point: ASTM D 36

Penetration at 25° C.: ASTM D5

Viscosity: evaluated at 150° C. using a Haeke roto-viscometer and a shear rate of 100s$^{-1}$

TABLE I

| Compound | Disulphide | Homogenization Time (hrs) | Penetration (dmm) | Softening Point (°C.) | Viscosity (m Pas) |
|---|---|---|---|---|---|
| 1 | diphenyl | 8 | 53 | 72 | 930 |
| 2 | dixylyl[1] | 3 | 52 | 70 | 810 |
| 3 | bis(2,4,5-trichlorophenyl) | 9 | 46 | 69 | 770 |
| 4 | bis(4-nitrophenyl) | 3 | 43 | 87 | 1700 |
| 5 | bis(4-aminophenyl) | 7 | 46 | 74 | 1000 |
| 6 | bis(3-t-butyl-6-methyl-methyl-4-hydroxy-phenyl)[2] | 10 | 40 | 76 | 1000 |
| 7 | bis(orthobenzoic acid) | 4 | 45 | 64 | 690 |
| A | None | — | 43 | 75 | 1100 |
| B | tetramethylthiuram | n.h.[3] | 39 | 78 | 1300 |

[1]used as a mixture of isomers as supplied by MAFKI, Hungary
[2]as sold by Monsanto as an anti-oxidant under the trade name SANTONOX
[3]"not homogeneous"

The results are given above in Table I. It can be seen that the sulphur-donating tetramethylthiuram disulphide did not impart homogeneity of the polymer-bitumen blend whereas homogeneity was achieved with all of the other disulphides tested. Whereas for most of the disulphides a long homogenisation time was found to be necessary, for bis(4-nitrophenyl) disulphide only 3 hours homogenisation time was needed. More surprisingly, a significant and advantageous increase in the softening point (by 12° C.) and in the high temperature viscosity (by 600 mPa.s) was achieved with bis(4-nitrophenyl) disulphide when all of the blends homogenised with the other disulphides gave a similar or lower softening point or viscosity than the same blend without a disulphide compatibilizer.

Other bis(nitroaryl) disulphides tested by the same procedure in similar polymer-bitumen blends include bis (nitropyridyl) disulphide, bis(2-nitrophenyl) disulphide, bis (3-nitrophenyl) disulphide and bis(3-carboxy-4-nitrophenyl) disulphide. All were found to be effective compatibilizing agents.

EXAMPLE 2

The properties of polymer-bitumen blends rendered homogeneous by the use of the disulphide Compounds 2 and 4 of Example 1 were further investigated. Firstly 5% w/w polymer-bitumen blends were prepared by the general procedure described for Example 1 above, with 1% w/w disulphide added. The polymer and bitumen used were the same as specified therein. The ductility, elastic recovery and the low temperature property of Fraass Breaking Point and high temperature zero-shear viscosity were investigated for the two blends prepared. The results are given in Table II below.

Then blends of the same bitumen with 3,5 and 7% w/w of the same SBS polymer compatibilized with 1% bis(4-nitrophenyl) disulphide were prepared by the same general procedure and the softening point, penetration, dynamic viscosity, ductility, elastic recovery, Fraass Breaking Point and zero-shear viscosity measured. The results are given in Table III below.

The test methods used are:

Fraass Breaking Point: IP 80/53

Zero-Shear Viscosity: determined in a creep experiment carried out with a Carrimed controlled stress rheometer at 40° C.; the zero shear viscosity is calculated from the creep and creep recovery curve Ductility at 13° C.: ASTM D113-86

Elastic Recovery: equipment and sample preparation as in DIN 52013; samples are stretched to 20 cm or 50 cm elongation and cut in halves—after 1 hour at 13° C. the recovery is measured.

For the softening point, penetration and dynamic viscosity the same standard methods were used as hereinbefore noted.

TABLE II

| Disulphide | Ductility at 13° C. (cm) | Elastic Recovery (%) | Fraass Breaking Point (°C.) | Zero-Shear Viscosity @ 40° C. ($10^5$ mPa·s) |
|---|---|---|---|---|
| None | 84 | 85 | −16 | 1.9 |
| Cpd 2 | 81 | 85 | −27 | 4.4 |
| Cpd 4 | 60 | 90 | −25 | 34.9 |

TABLE III

| Amount of SBS (%) | Softening Point (°C.) | Penetration @ 25° C. (dmm) | Viscosity @ 150° C. (mPas) | Ductility at 13° C. (cm) | Elastic Recovery (%) 20 cm | Fraass Breaking Point (°C.) | Zero-Shear Viscosity @ 40° C. ($10^5$mPa.s) |
|---|---|---|---|---|---|---|---|
| 3 | 61 | 51 | 590 | —[1] | 80 | −19 | 2.1 |
| 5 | 87 | 43 | 1700 | 60 | 90 | −27 | 34.9 |
| 7 | 94 | 36 | 2890 | —[1] | 90 | −28 | 320 |

[1]not measured

It can be clearly seen that while both blends using the disulphides 2 and 4 gave a significantly improved Fraass Breaking Point, Compound 4 additionally gave a vastly increased zero-shear viscosity. Furthermore, the effect is obtained, in varying degrees, when the amount of SBS polymer in the blend is varied.

EXAMPLE 3

To confirm the assessment of homogeneity achieved with the process of the present invention, hot storage stability of blends of polymer, bitumen and disulphide were carried out according to a standard procedure at either 5 days at 160° C. or 7 days at 160° C. In the standard hot storage stability test 200 g samples of the polymer-modified bitumen were poured into 250 ml aluminium cans. The head space was flushed with nitrogen before closing the cans. After storage for 5 (or 7) days in a nitrogen purged oven, the samples were allowed to cool down to ambient temperature and, subsequently, cut in halves. Storage stability of the polymer-modified bitumen is assessed on the basis of differences in the penetration and softening point of the top and bottom layer.

The blends tested were 0.2%, 0.5% and 1% w/w bis(4-nitrophenyl) disulphide in a blend of 5% w/w of the aforementioned SBS in Mexphalte 80/100 base bitumen of penetration 80 dmm and softening point of 46.2° C. The polymer-bitumen blends without disulphide were also tested. The blends containing disulphide were all found to be storage stable but the polymer-bitumen blends alone were not storage stable and separated out into two distinct phases on storage.

We claim:

1. A method for improving the storage stability of a polymer-modified bituminous composition which comprises adding to a composition comprising a bituminous component and a polymer modifier from 0.1 to 10 percent by weight of the total bituminous composition of a compatibilizing agent which is a bis(nitroaryl) disulphide and/or a nitroaryl aryl disulphide.

2. A method as claimed in claim 1, wherein the compatibilizing agent is a bis(nitrophenyl) disulphide and/or nitrophenyl phenyl disulphide.

3. A method as claimed in claim 2, wherein the compatibilizing agent is bis(4-nitrophenyl) disulphide and/or 4-nitrophenyl phenyl disulphide.

4. A method as claimed in claim 1, wherein the polymer is a styrene-butadiene-styrene block copolymer.

5. A method as claimed in claim 4, wherein the polymer is present in the composition in an amount in the range of from 1 to 15% by weight.

6. A method as claimed in claim 1, wherein the disulphide is used in an amount in the range of from 0.1 to 2% by weight of the total bituminous composition.

7. A process for the preparation of a polymer-modified bituminous composition which comprises contacting the polymer and bitumen at a temperature in the range of from 100° C. to 250° C. in the presence of from 0.1 to 10 percent by weight of the total bituminous composition of a bis (nitroaryl) disulphide and/or a nitroaryl aryl disulphide in order to achieve a storage stable homogeneous blend.

8. A process as claimed in claim 7, wherein the polymer and bitumen are pre-blended at a temperature in the range of from 100° C. to 250° C.

9. A polymer-modified bituminous composition which comprises as a compatibilizing agent from 0.1 to 10 percent by weight of the total bituminous composition of a bis (nitroaryl) disulphide and/or nitroaryl aryl disulphide.

* * * * *